US006546206B2

United States Patent
Murakami (10) Patent No.: US 6,546,206 B2
(45) Date of Patent: Apr. 8, 2003

(54) OPTICAL APPARATUS (75) Inventor: Junichi Murakami, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/985,245

(22) Filed: Nov. 2, 2001

(65) Prior Publication Data

US 2002/0057910 A1 May 16, 2002

(30) Foreign Application Priority Data

Nov. 10, 2000 (JP) ........................................ 2000-344464

(51) Int. Cl.[7] .............................. G03B 7/10; G03B 7/20
(52) U.S. Cl. ....................... 396/260; 396/429; 396/529; 348/64; 348/363; 348/375
(58) Field of Search ................................. 396/259, 429, 396/260, 529–532, 508, 505; 348/64, 362–366, 375

(56) References Cited

U.S. PATENT DOCUMENTS

| 4,325,614 | A | * | 4/1982 | Grimes | 396/260 X |
| 4,472,740 | A | * | 9/1984 | Doi | 348/375 |
| 4,812,868 | A | * | 3/1989 | Utagawa et al. | 396/529 X |
| 5,739,854 | A | | 4/1998 | Nishikawa | 348/335 |
| 5,953,062 | A | | 9/1999 | Sugimori et al. | 348/364 |
| 6,345,154 | B1 | * | 2/2002 | Kubo | 396/529 X |

FOREIGN PATENT DOCUMENTS

JP 2873877 1/1999 ............ G03B/7/20

OTHER PUBLICATIONS

Magneto–Resistive IC Memory Limitations and Architecture Implications, 1998 IEEE, by Roy E. Scheuerlein (pp. 47–50).

* cited by examiner

Primary Examiner—W. B. Perkey
(74) Attorney, Agent, or Firm—Fitzpatrick, Cella, Harper & Scinto (57) ABSTRACT An optical apparatus includes an actuator for driving an optical function member of an interchangeable lens, a storage part (memory) storing a plurality of driving patterns for the actuator in advance, and a controller for controlling the actuator to perform driving using one of the plurality of driving patterns stored in the storage part (memory). The controller selects one of the plurality of driving patterns from the storage part (memory) in accordance with the type of image pickup apparatus on which the interchangeable lens is mounted.

21 Claims, 8 Drawing Sheets

| EN1 | IN1 | Tr1 | Tr2 | Tr3 | Tr4 |
|-----|-----|-----|-----|-----|-----|
| H | H | ON | OFF | OFF | ON |
| H | L | OFF | ON | ON | OFF |
| L | H | OFF | OFF | OFF | OFF |
| L | L | OFF | OFF | OFF | OFF |

FIG. 5

| ADDRESS | 0 | 1 | 2 | 3 | 4 | 5 | 6 | 7 |
|---------|---|---|---|---|---|---|---|---|
| Dn12 | H'FF | H'FF | H'80 | H'00 | H'00 | H'00 | H'80 | H'FF |

FIG. 6

| ADDRESS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| DnS | H'FF | H'FE | H'FC | H'F9 | H'F5 | H'F0 | H'E9 | H'E2 | H'D9 | H'D0 | H'C6 | H'BB | H'B0 | H'A4 | H'98 | H'8C |

| 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|
| H'80 | H'73 | H'67 | H'5B | H'4F | H'44 | H'39 | H'2F | H'26 | H'1D | H'16 | H'0F | H'0A | H'06 | H'03 | H'01 |

| 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|
| H'00 | H'01 | H'03 | H'06 | H'0A | H'0F | H'16 | H'1D | H'26 | H'2F | H'39 | H'44 | H'4F | H'5B | H'67 | H'73 |

| 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|
| H'80 | H'8C | H'98 | H'A4 | H'B0 | H'BB | H'C6 | H'D0 | H'D9 | H'E2 | H'E9 | H'F0 | H'F5 | H'F9 | H'FC | H'FE |

OPTICAL APPARATUS

BACKGROUND OF THE INVENTION

1. Field of the Invention

The present invention relates to an optical apparatus and, more particularly, to an optical apparatus including different types of image pickup apparatuses in different image taking forms, an interchangeable lens used for the image pickup apparatuses, and a driving scheme for the aperture stop of this interchangeable lens.

2. Related Background Art

As an image taking apparatus of the lens interchangeable type which consists of a lens detachably attached to a body of the image taking apparatus, a video camera, a single-lens reflex camera using a silver halide film, and the like are available. In an interchangeable lens camera system of this type, an interchangeable lens is comprised of an image taking lens for taking an image, a driving part for driving the image taking lens for zooming and focusing, an aperture stop, a stop driver part, a control part (CPU or the like) for controlling the respective driving parts and communicating information with a camera body, a mount part, and the like.

An interchangeable lens is mounted on a camera body by mechanically coupling the mount part of the interchangeable lens to the mount part of the camera body. Each mount part has electric contacts. When the mount parts are mounted on each other, they are electrically coupled to each other immediately to allow mutual communication of various kinds of information in a predetermined format between the interchangeable lens and the camera body. This makes it possible to perform various control operations for the camera and realize an interchangeable lens type camera system.

For a single-lens reflex camera, an interchangeable lens having unique characteristics based on a format unique to the single-lens reflex camera is prepared. In addition, for a video camera, an interchangeable lens having unique characteristics based on a format unique to the video camera is prepared. For this reason, an interchangeable lens for a single-lens reflex camera cannot be directly mounted on a video camera. Recently, however, an exchange adaptor has been available, which allows an interchangeable lens for a single-lens reflex camera to be used with a video camera by matching the respective mount parts, optical paths, communication formats, and various data.

Of the basic functional differences between the single-lens reflex camera and the video camera, the AE (Automatic Exposure) control schemes will be described below.

According to the AE control scheme in the single-lens reflex camera, the difference between the absolute value information of the current aperture stop and the absolute value information of a target aperture stop is converted on the camera side in accordance with a driving means on the lens side. The converted data is then sent to the lens side. On the lens side, light amount control is performed by driving the aperture stop by the designated amount, thereby performing control to finally achieve the aperture stop (light amount) intended by the user.

The stop driver part of an interchangeable lens for a single-lens reflex camera therefore uses a stepping motor as a driving source, with one step of the stepping motor being made to correspond to a predetermined number of stages of an aperture stop (e.g., 1/8 stage). A step count is received from the camera body at a predetermined timing by mutual communication based on the predetermined format, and the aperture stop is driven at the maximum speed determined by the characteristics of the driver part on the lens side. In the driving scheme for the stepping motor, rectangular wave driving is performed to realize high-speed driving.

According to the AE control scheme for the video camera, the difference value between a reference amount of light and the current amount of light is sent to the lens side, and the aperture stop is then driven on the basis of the difference value on the lens side to perform light amount control, thereby finally matching the actual amount of incident light with the reference amount of light. For example, Japanese Patent No. 2873877 discloses a matching means in this AE control scheme. In the above adaptor, the difference value between the reference amount of light and the current amount of light is received from the video camera side, and the difference value is converted into information of an absolute driving amount and sent to the lens side. With this operation, an interchangeable lens for a single-lens reflex camera can be used for a video camera.

Although no problem arises in terms of mechanical, electrical, and optical coupling between an interchangeable lens for a single-lens reflex camera and a video camera owing to the above adaptor, the following problem is posed due to the operation characteristics of an aperture stop because of the differences in basic function between the single-lens reflex camera and the video camera.

First of all, the single-lens reflex camera and video camera differ in their necessary aperture stop operation characteristics. The basic function of the video camera includes recording sounds as well as taking images. The operation of the aperture stop of the interchangeable lens for the video camera needs to be quiet.

If, however, the conventional interchangeable lens for the single-lens reflex camera is used for the video camera through the above adaptor, since the aperture stop is driven at the maximum speed by rectangular wave driving in the lens, quiet operation cannot be substantially performed. For this reason, sound produced in this operation is also recorded.

SUMMARY OF THE INVENTION

The present invention has been made in consideration of the above situation, and has as its object to provide an optical system including an interchangeable lens which can be effectively applied to a plurality of types of image pickup apparatuses and can always ensure a proper function and an image pickup apparatus on which the interchangeable lens is mounted.

In order to achieve the above object, the present invention comprises:

an actuator for driving an optical function member of an interchangeable lens;

a storage part storing a plurality of driving patterns for the actuator in advance; and a controller for controlling the actuator to perform driving by using one of the plurality of driving patterns stored in the storage part, wherein the controller selects one of the plurality of driving patterns from the storage part in accordance with a type of image pickup apparatus on which the interchangeable lens is mounted.

In addition, the present invention comprises:

an actuator for driving an optical function member;

a storage part storing a plurality of driving patterns for the actuator in advance; and a controller for controlling the actuator to perform driving by using one of the plurality of driving patterns stored in the storage part, wherein the controller selects one of the plurality of driving patterns from the storage part in accordance with a type of image pickup apparatus on which an interchangeable lens is mounted.

Furthermore, the present invention comprises:

an interchangeable lens having a mount with an electric contact for communication;

an image pickup apparatus having a mount which is detachably coupled to a mount of an interchangeable lens and has an electric contact connected to the electric contact of the interchangeable lens to perform communication;

an actuator for driving an optical function member of the interchangeable lens;

a storage part storing a plurality of driving patterns for the actuator in advance; and a controller for obtaining predetermined information from the image pickup apparatus by the communication through the electric contacts and controlling the actuator to perform driving by using one of the plurality of driving patterns stored in the storage part, wherein the controller selects one of the plurality of driving patterns from the storage part in accordance with the predetermined information obtained by the communication.

The above and other objects, features, and advantages of the present invention will be apparent from the following detailed description in conjunction with the accompanying drawings and the appended claims.

DETAILED DESCRIPTION OF THE PREFERRED EMBODIMENTS

The preferred embodiments of the present invention will be described below.

Figure 1:
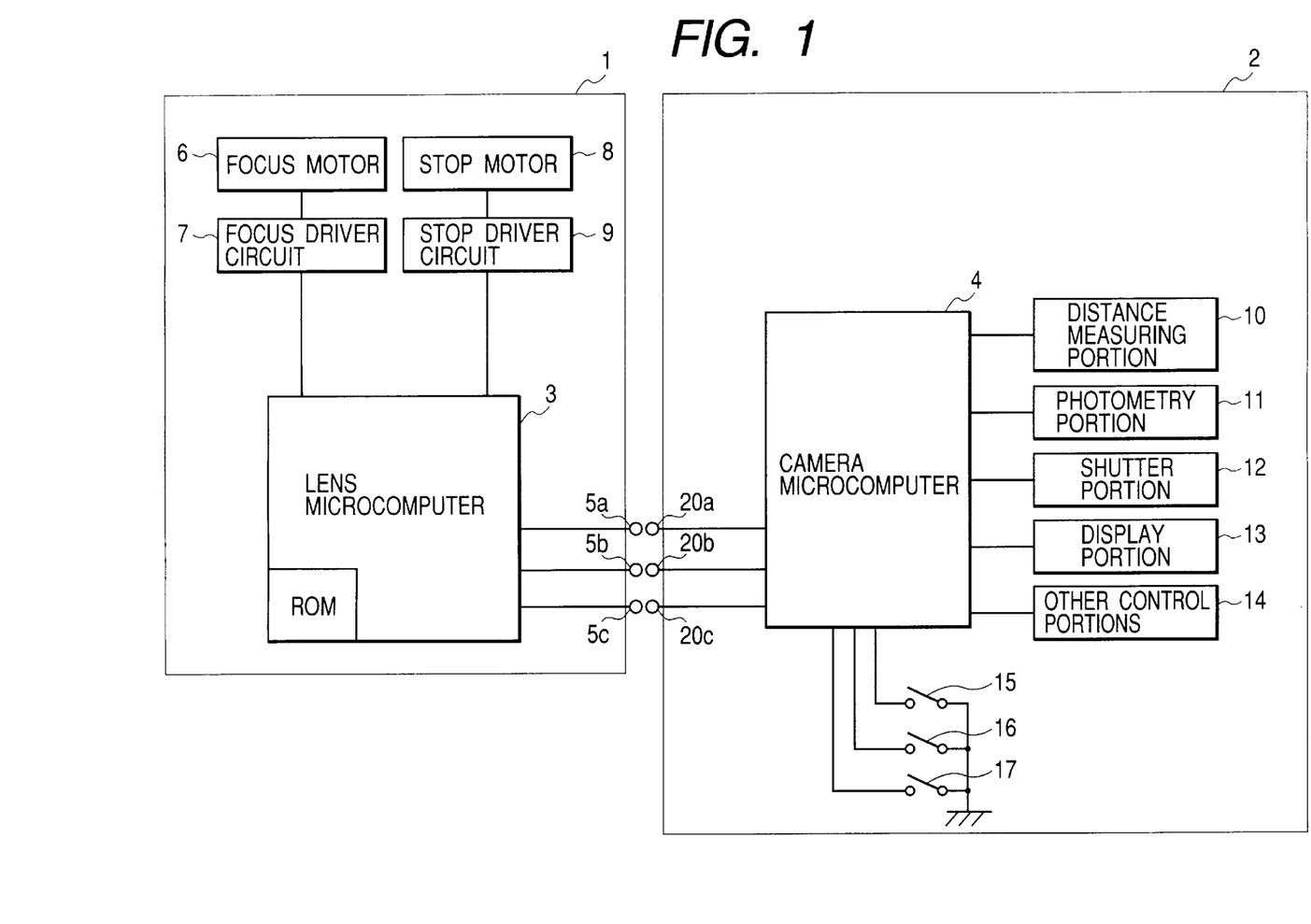
FIG. 1 is a block diagram showing an interchangeable lens and camera in an embodiment of an optical apparatus of the present invention.

FIG. 1 is a block diagram for explaining an optical apparatus according to an embodiment of the present invention, and showing a state in which an interchangeable lens is mounted on a single-lens reflex camera. Referring to FIG. 1, this apparatus includes a lens 1, a camera 2, lens microcomputer 3, and camera microcomputer 4. The lens microcomputer 3 communicates with the camera microcomputer 4 through electric contacts for communications, i.e., an electric contact 5a (for clock signals), electric contact 5b (for the transfer of signals from the camera to the lens), and electric contact 5c (for the transfer of signals from the lens to the camera). In this case, the camera 2 is a single-lens reflex camera for image taking (recording) an object image on a silver halide film.

A focus motor 6 is formed by, for example, a vibration type motor. The focus motor 6 is controlled by the lens microcomputer 3 through a focus driver circuit 7 to perform focusing by driving a focus adjustment lens. A stop motor 8 is formed by using, for example, a stepping motor. The stop motor 8 is controlled by the lens microcomputer 3 through a stop driver circuit 9 to stop down the lens to a predetermined position or restore the camera to the full aperture state.

The lens microcomputer 3 transfers the state in the lens (e.g., a zoom position, focus position, and aperture value) and information about the lens (e.g., a full aperture value, focal length, and data required for distance measuring operation) to the camera side through the communication line 5c. The lens microcomputer 3, focus driver circuit 7, and stop driver circuit 9 constitute a lens electric system. A power supply in the camera supplies power to this lens electric system through electric contacts (a signal processing system power supply, signal processing system ground, driving system power supply, and driving system ground) (not shown).

The camera 2 incorporates a distance measuring part 10, a photometry part 11, a shutter part 12, a display part 13, other control parts 14, and the camera microcomputer 4 for controlling the operation start/stop and the like of these parts and performing exposure computation, distance measurement computation, and the like. The camera microcomputer 4 transfers information about lens control (e.g., an aperture control value and focus control value) and information about the camera (the type of camera body and information indicating whether to record sound information) to the lens microcomputer 3 through the communication line 5b.

A switch (to be also referred to as an SW1) 15 is used to start photometry or distance measurement. A release switch (to be also referred to as an SW2) 16 is used to start release operation. These switches are generally two-stroke switches. The release button is pressed to the first stroke to turn on the switch SW1 and is pressed to the second stroke to turn on the release switch SW2. This system also includes an exposure mode selection switch (to be also referred to as an SWM) 17. An exposure mode can be changed by turning on/off the exposure mode selection switch 17 or simultaneously operating the exposure mode selection switch 17 and other operation members.

Figure 2:
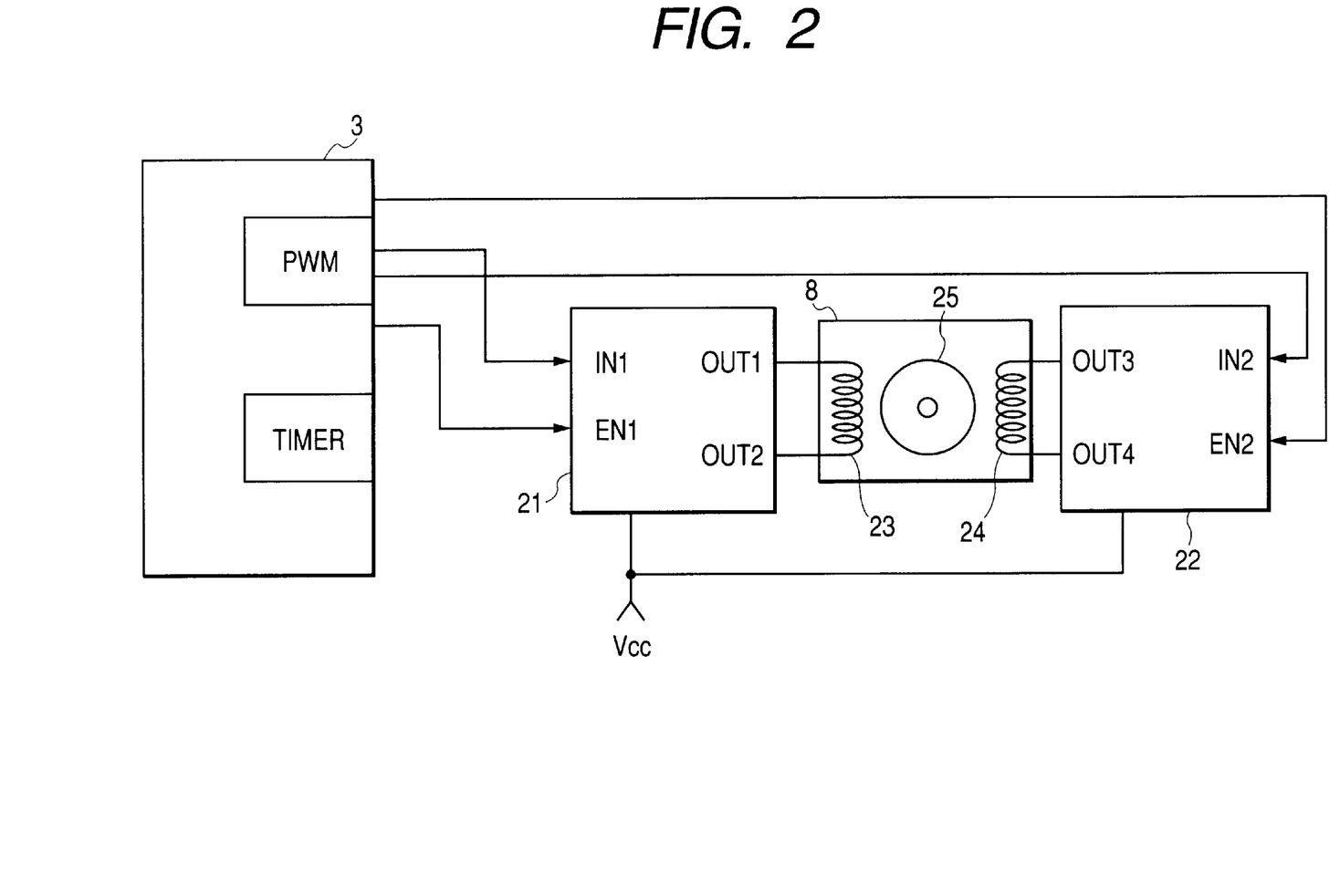
FIG. 2 is a view showing an example of an arrangement for driving a stop motor in the embodiment of the optical apparatus of the present invention.

FIG. 2 shows an example of the detailed arrangement of the lens microcomputer 3, a 2-phase pulse motor serving as a stepping motor forming the stop motor 8, and the stop driver circuit 9. This arrangement also includes driver circuits 21 and 22, motor windings 23 and 24 of the 2-phase pulse motor 8, and a magnet (rotor) 25 of the 2-phase pulse motor 8. The lens microcomputer 3 has a PWM output function (signals IN1 and IN2) capable of setting a duty ratio (the ratio of H level to a PWM period) and a timer function of switching excitation patterns at predetermined time intervals. The lens microcomputer 3 stores duty ratio data corresponding to the excitation patterns in a ROM.

Figure 3:
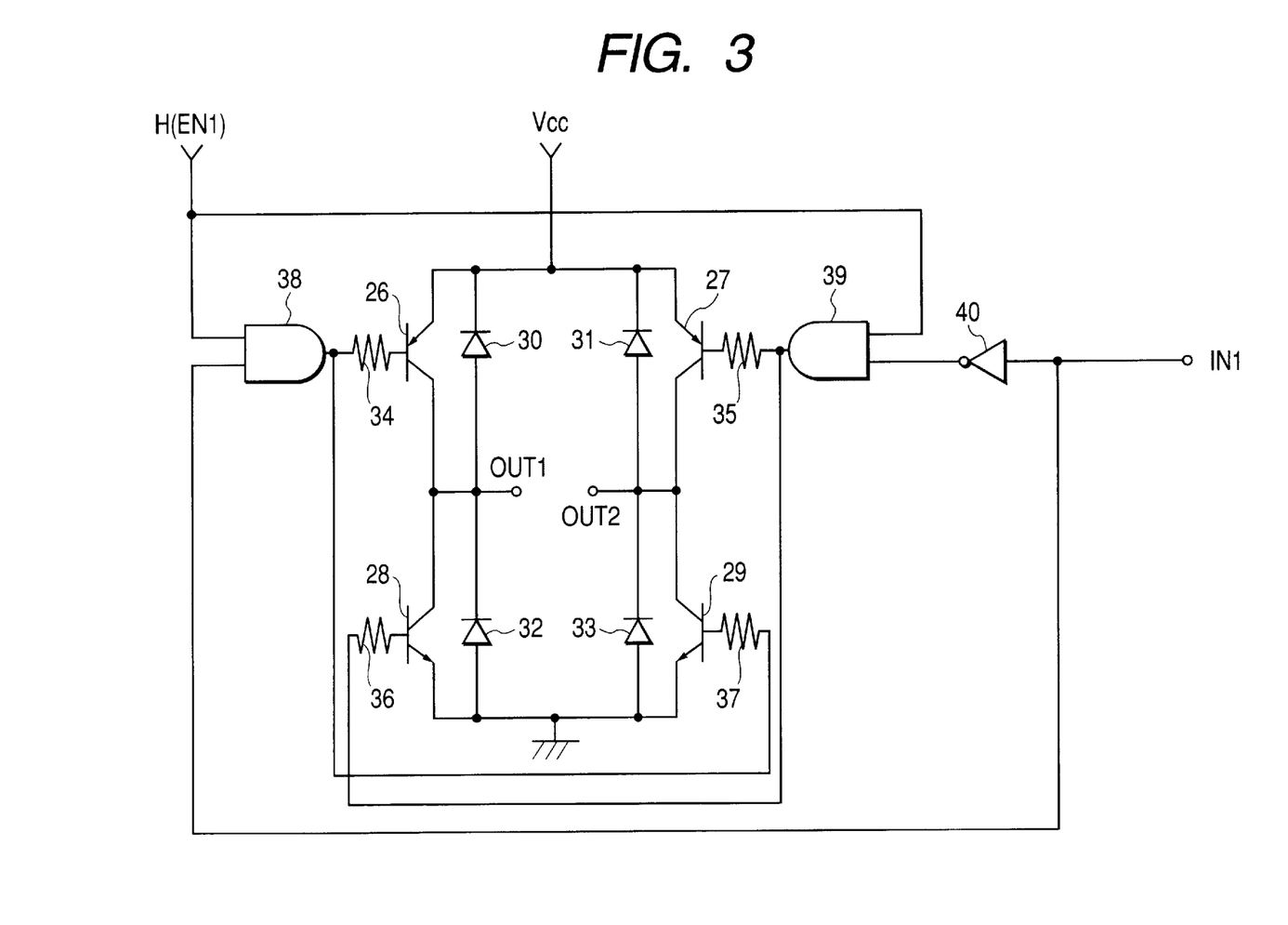
FIG. 3 is a view showing the internal arrangement of a driver circuit in the embodiment of the optical apparatus of the present invention.

FIG. 3 is a circuit diagram showing the internal arrangement of the driver circuits 21 and 22. This arrangement includes PNP transistors 26 and 27, NPN transistors 28 and 29, diodes 30, 31, 32, and 33, resistors 34, 35, 36, and 37, AND gates 38 and 39, and a NOT gate 40.

Referring to FIG. 3, when EN1 is at "H" level and the input IN1 is at "H" level, the transistor (to be referred to as the Tr hereinafter) 26 and Tr 29 are turned on, and the Trs 27 and 28 are turned off. As a consequence, a current flows in the motor winding 23 in FIG. 2 from OUT1 to OUT2.

When the input EN1 is at "H" level and the input IN1 is at "L" level, the Trs 27 and 28 are turned on and the Trs 26 and 29 are turned off. As a consequence, a current flows in the motor winding 23 in FIG. 2 from OUT2 to OUT1.

Figure 4:
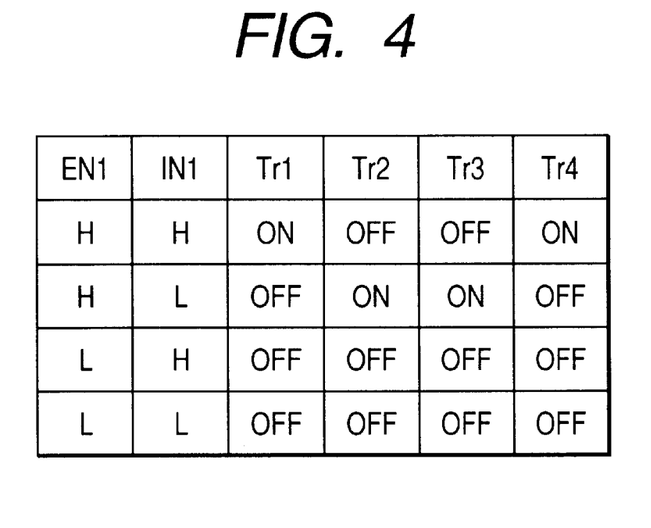
FIG. 4 is a view showing the input/output logic table of the driver circuit in the embodiment of the optical apparatus of the present invention.

When the input EN1 is at "L" level, the Trs 26, 27, 28, and 29 are turned off regardless of the input level of the input IN1. As a consequence, OUT1 and OUT2 are set in a high-impedance state. FIG. 4 shows the relationship between these inputs and outputs. This applies to IN2, EN2, OUT3, and OUT4.

A method of controlling motor winding currents by using the PWM signals (IN1 and IN2) will be described next.

The lens microcomputer 3 inputs PWM signals each having a predetermined frequency (e.g., a frequency higher than the human audio frequency) to the driver circuits 21 and 22. The motor windings 23 and 24 are driven according to the above logic (FIG. 4) depending on whether the PWM signals are "H" level or "L" level. Since each PWM frequency is high, a current corresponding to the duty ratio flows in the motor winding due to the influence of the inductance of the motor winding.

A method of performing 1–2 phase excitation driving, i.e., rectangular wave excitation driving, of the 2-phase pulse motor by using the driver circuit will be described next with reference to FIG. 5.

Figure 5:
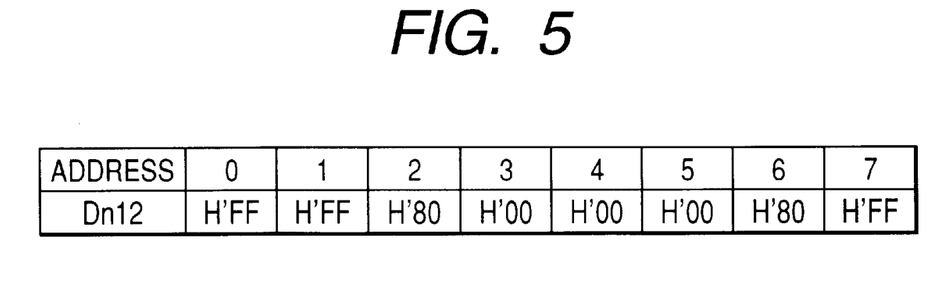
FIG. 5 is a view showing the duty ratio data of 1–2 phase excitation patterns in the embodiment of the present invention.

The duty ratio data (Dn12) of the 1–2 phase excitation patterns (rectangular wave excitation driving patterns) shown in FIG. 5 is stored in the ROM in the lens microcomputer 3. The upper rows represent the addresses of the duty ratio data (Dn12) which are assigned for the sake of convenience. The 1–2 phase excitation patters include eight patterns (0 to 7) per period. The numerical values on the lower rows of the data are the duty ratio data (hexadecimal notation) stored at the respective addresses. The maximum value of the duty ratio data is represented by H'FF, and the minimum value will be represented by H'00. When the data is H'FF, IN1 is always at "H" level. When the data is H'00, IN1 is always at "L" level. When the data is H'80, the duty ratio becomes 50%.

The duty ratio data of the 1–2 phase excitation patterns (rectangular wave excitation driving patterns) are sequentially read out, set, and output by timer interruption of the lens microcomputer 3. By shifting the readout data address of IN2 by 2 with respect to the readout data address of IN1, the 1–2 phase excitation patterns of the 2-phase pulse motor are realized. The rotational speed of the motor can be controlled by operating a timer interruption time (Tt).

A method of performing sine wave excitation driving of the 2-phase pulse motor by using the driver circuit will be described next with reference to FIG. 6.

Figure 6:
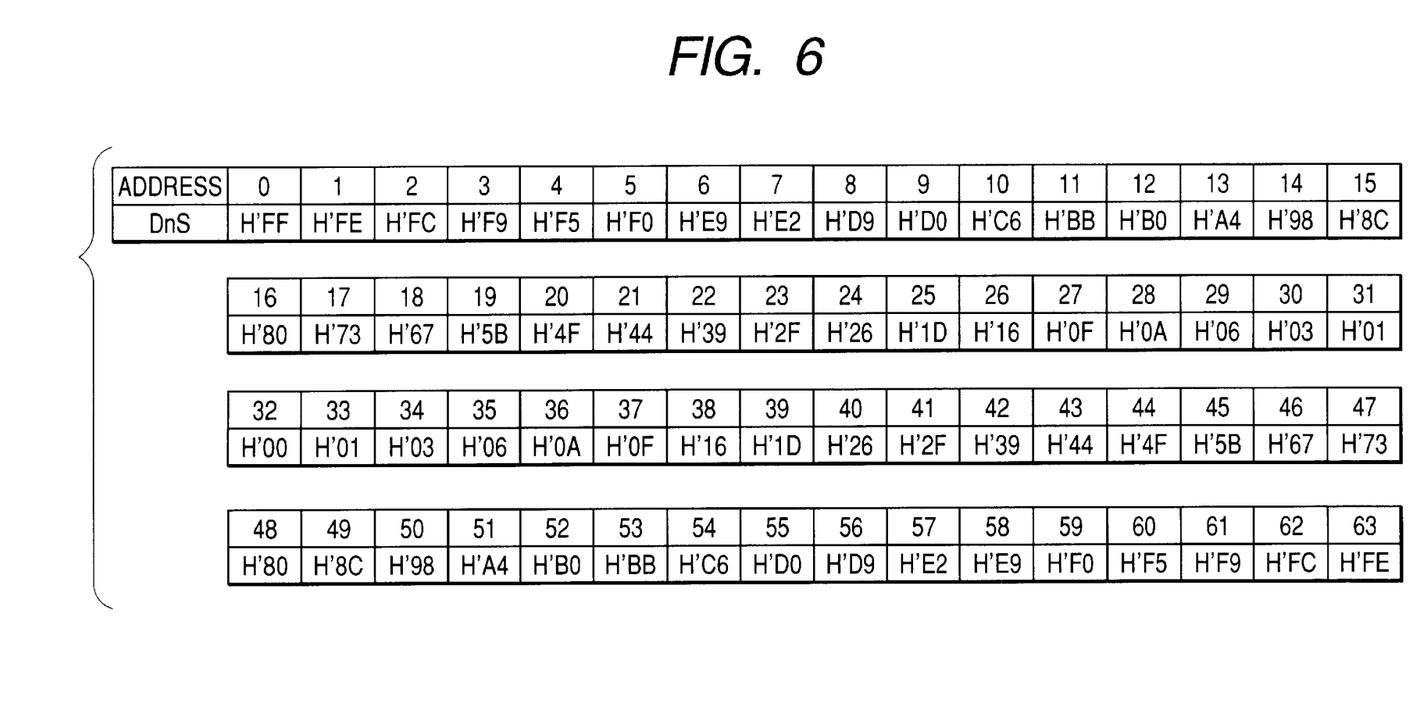
FIG. 6 is a view showing the duty ratio data of sine wave excitation patterns in the embodiment of the present invention.

The duty ratio data (DnS) of sine wave excitation patterns shown in FIG. 6 are stored in the ROM of the lens microcomputer 3. The upper rows represent the addresses of the duty ratio data (DnS) which are assigned for the sake of convenience. In this case, one period is divided into 64 parts (0 to 63). The numerical values on the lower rows represent the duty ratio data (hexadecimal notation) stored at the respective addresses.

The duty ratio data of the sine wave excitation patterns are sequentially read out, set, and output by timer interruption of the lens microcomputer 3. By shifting the addresses of read data of IN1 and IN2 by 16, the sine wave excitation patterns of the 2-phase pulse motor are realized. By controlling the timer interruption time (Tt), the rotational speed of the motor can be controlled.

Figure 7A:
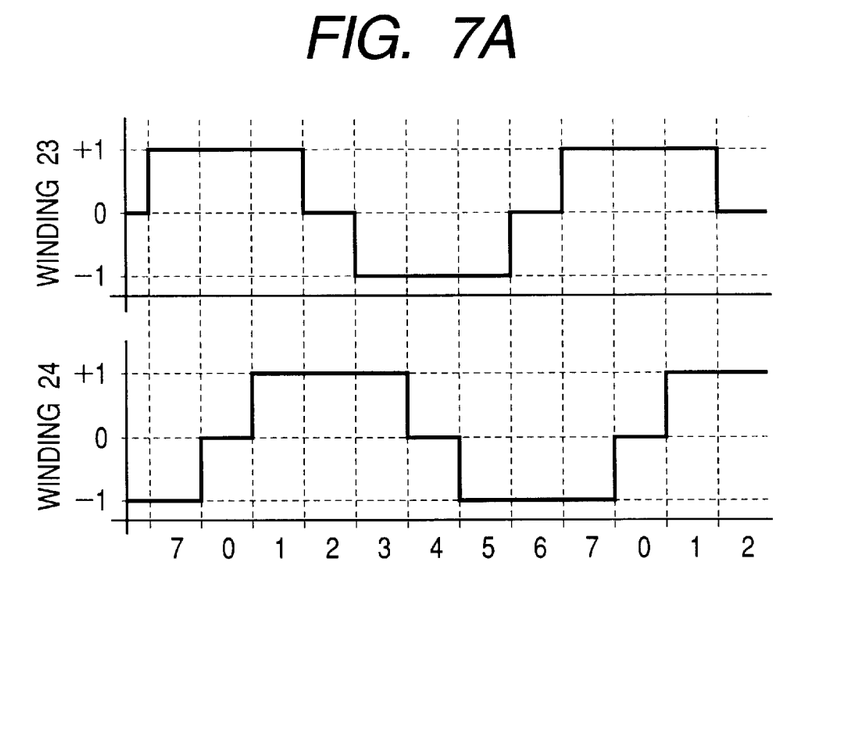
FIGS. 7A and 7B are graphs showing changes in current in motor windings in 1–2 phase excitation driving and sine wave excitation driving in the embodiment of the present invention.
Figure 7B:
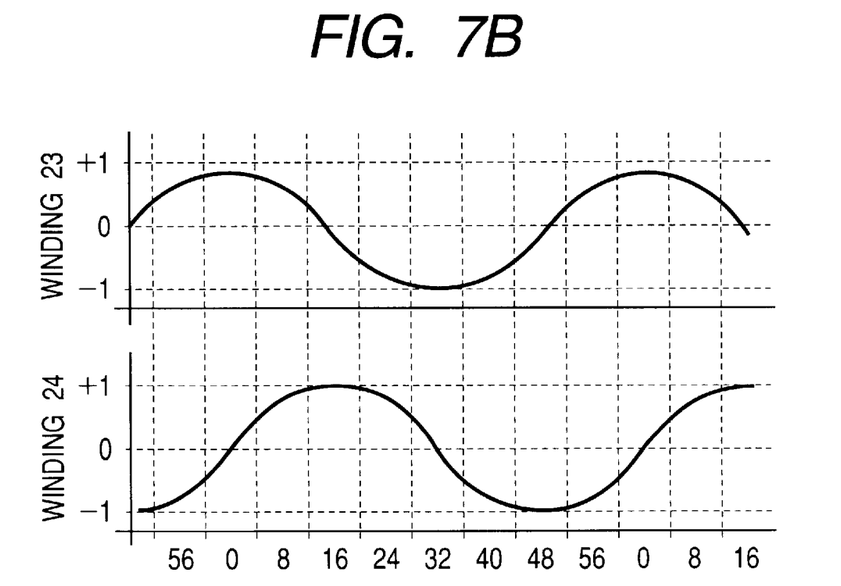

FIGS. 7A and 7B show currents flowing in the respective motor windings when the motor is driven by the above methods. FIG. 7A shows the case of 1–2 phase excitation driving (rectangular wave excitation driving). FIG. 7B shows the case of sine wave excitation driving. Referring to each of FIGS. 7A and 7B, the abscissa represents the address of each read data.

By the above methods, 1–2 phase excitation driving (rectangular wave excitation driving) and sine wave excitation driving of the 2-phase pulse motor forming the stop motor 8 can be performed.

In the optical apparatus of the embodiment shown in FIG. 1, the interchangeable lens 1 is mounted on the single-lens reflex camera 2 for image taking (recording) an object image on a silver halide film (that is, this camera does not record sound information and includes a digital still camera for image taking (recording) only an image). The operation of this system will be described below. Note that the mount of the interchangeable lens 1 can be directly attached/to or detached from the mount of the camera 2.

When the interchangeable lens 1 is mounted on the camera 2, electric contacts 20a, 20b, and 20c of the camera 2 are connected to the electric contacts 5a, 5b, and 5c of the lens 1 to form a plurality of communication lines between the lens 1 and the camera 2. Communication between the lens and the camera is performed through these communication lines. With this communication, the camera microcomputer 4 transmits, to the lens microcomputer 3, information indicating that "the camera on which the lens 1 is mounted is a camera designed to record images (record no sound)". In accordance with this information, the lens microcomputer 3 controls the stop driver circuit 9 to perform rectangular wave excitation driving of the stop motor 8 by using the rectangular wave excitation patterns in the ROM which have been described with reference to FIG. 5. The lens microcomputer 3 controls the stop driver circuit 9 to perform rectangular wave excitation driving of the stop motor 8 in accordance with the information of aperture control values output from the camera microcomputer 4, thereby driving the aperture stop (not shown) to a target aperture value at high speed.

In the above embodiment, the optical apparatus having the interchangeable lens 1 mounted on the single-lens reflex camera or digital still camera designed to record only images (record no sound information) has been described. However, the present invention can be applied to an optical system having the above interchangeable lens 1 mounted on an image pickup apparatus such as a video camera or digital still camera having an image pickup device, e.g., a CCD, and a microphone and designed to record image and sound information. An embodiment of an optical apparatus having the interchangeable lens 1 mounted on a video camera (including a digital still camera) designed to record image and sound information will be described below.

Figure 8:
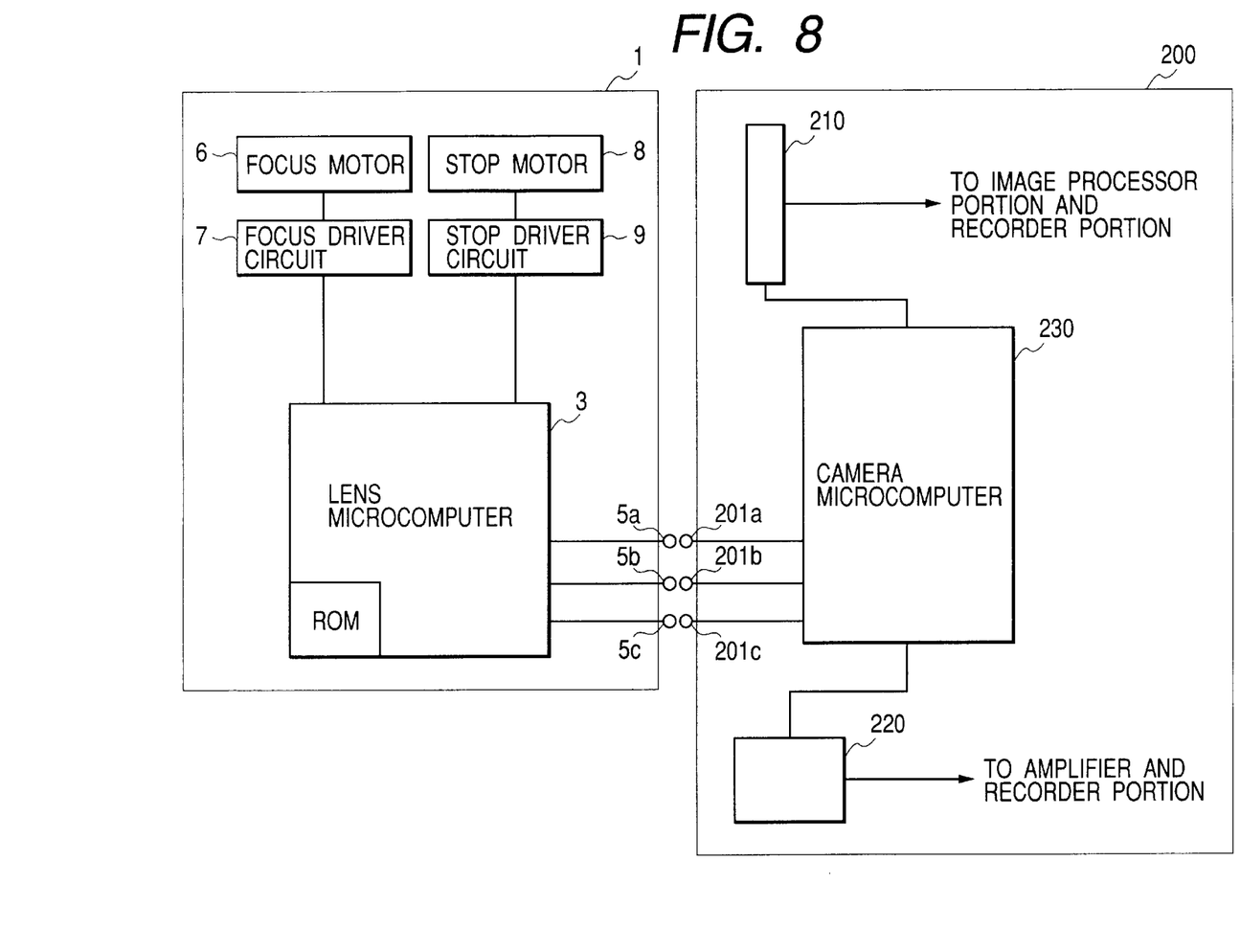
FIG. 8 is a block diagram showing an interchangeable lens and camera in another embodiment of the optical apparatus of the present invention.

FIG. 8 is a block diagram showing an embodiment of an optical apparatus of the present invention which has the interchangeable lens 1 mounted on a video camera 200. In this case, the mount of the interchangeable lens 1 can be directly attached/to or detached from the mount of the video camera 200.

The video camera 200 includes an image pickup device 210 for picking up an object image from the interchangeable lens 1, a microphone 220 for capturing sounds in image-taking operation, and a camera microcomputer 230 for controlling each function of the video camera 200 and communicating with the lens microcomputer 3 to exchange various type of information. The image signal output from the image pickup device 210 is sent to a recorder part (not shown) through an image processor part (not shown) to be recorded. The image signal from the image pickup device 210 is also output to the camera microcomputer 230. The camera microcomputer 230 then outputs information of an aperture control value to the lens microcomputer 3 on the basis of the brightness information of the image signal. The sound signal output from the microphone 220 is sent to the recorder part (not shown), together with the image signal, through an amplifier (not shown) to be recorded.

When the interchangeable lens 1 is mounted on the video camera 200, electric contacts 201a, 201b, and 201c of the video camera 200 are electrically connected to the electric contacts 5a, 5b, and 5c of the lens 1 to form a plurality of communication lines between the lens 1 and the video camera 200. Communication between the lens and the video camera is performed through these communication lines. With this communication, the camera microcomputer 230 transmits, to the lens microcomputer 3, information indicating that "the camera on which the interchangeable lens 1 is mounted is a video camera (including a digital still camera) designed to record image and sound information". With this information, the lens microcomputer 3 controls the stop driver circuit 9 to perform sine wave excitation driving of the stop motor 8 by using the sine wave excitation patterns in the ROM which have been described with reference to FIG. 6. The lens microcomputer 3 controls the stop driver circuit 9 to perform sine wave excitation driving of the stop motor 8 in accordance with the information of the aperture control value output from the camera microcomputer 230, thereby driving the aperture stop (not shown) to a target aperture value. When image taking operation is performed by using the video camera 200, an image is picked up by the image pickup device 210, and sounds are captured by the microphone 220. The image signal and sound signal are then recorded on the recorder part. In this case, since the aperture stop is driven by performing sine wave excitation driving of the stop motor 8, aperture stop operation produces very small sounds. This makes it possible to prevent the sound produced by aperture stop operation from being captured by the microphone 220.

An embodiment in which the interchangeable lens 1 is mounted on a video camera 400 through an adaptor 300 will be described next.

Figure 9:
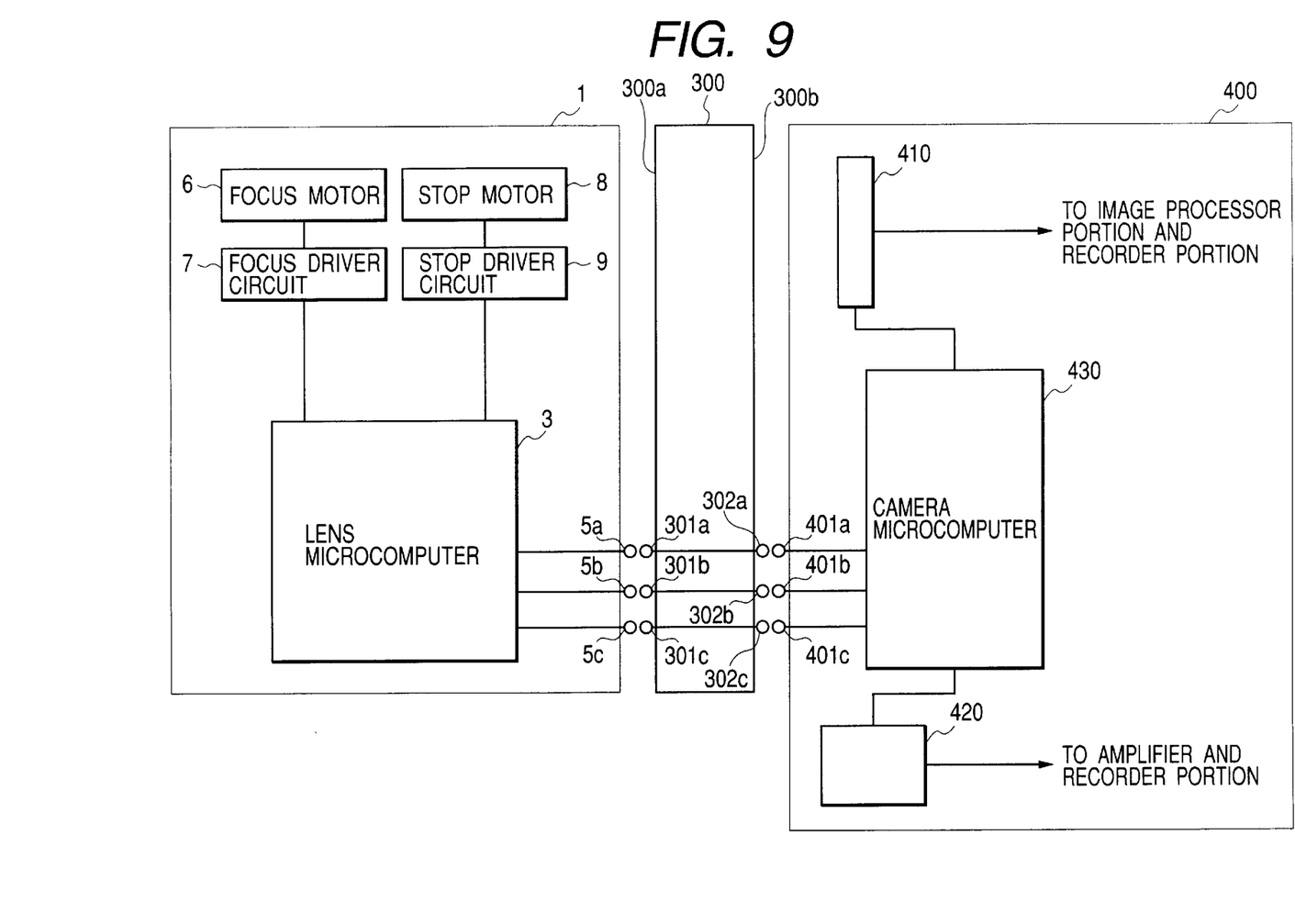
FIG. 9 is a block diagram showing an interchangeable lens, adaptor, and camera in still another embodiment of the optical apparatus of the present invention.

FIG. 9 is a block diagram showing an embodiment of an optical apparatus according to the present invention which has the interchangeable lens 1 mounted on the video camera 400 through the adaptor 300. In this case, the video camera is used to record image and sound information. This camera may be video camera or digital still camera. In this case, the mount of the interchangeable lens 1 can be directly attached/to or detached from a mount 300a of the adaptor 300 which is located on one side. A mount 300b of the adaptor 300 which is located on the other side can be directly attached/to or detached from the video camera 400. In this case, therefore, the interchangeable lens 1 cannot be directly mounted on the video camera 400 but is mounted on the video camera 400 through the adaptor 300.

The video camera 400 includes an image pickup device 410 for picking up an object image through the interchangeable lens 1, a microphone 420 for capturing sounds in image-taking operation, and a camera microcomputer 430 for controlling each function of the video camera 400 and communicating with the lens microcomputer 3 through the adaptor 300 to exchange various type of information. The image signal output from the image pickup device 410 is sent to a recorder part (not shown) through an image processor part (not shown) to be recorded. The image signal from the image pickup device 410 is also output to the camera microcomputer 430. The camera microcomputer 430 then outputs information of an aperture control value to the lens microcomputer 3 on the basis of the brightness information of the image signal. The sound signal output from the microphone 420 is sent to the recorder part (not shown), together with the image signal, through an amplifier (not shown) to be recorded.

When the interchangeable lens 1 is mounted on the video camera 400 through the adaptor 300, electric contacts 401a, 401b, and 401c of the video camera 400 are electrically connected to the electric contacts 5a, 5b, and 5c of the lens 1 through electric contacts 301a, 301b, and 301c and correspondence contacts 302a, 302b and 302c of the adaptor 300 to form a plurality of communication lines between the lens 1 and the video camera 400. Communication between the lens and the video camera (through the adaptor) is performed through these communication lines. With this communication, the camera microcomputer 430 transmits, to the lens microcomputer 3, information indicating that "the camera on which the interchangeable lens 1 is mounted is a video camera designed to record image and sound information". With this information, the lens microcomputer 3 controls the stop driver circuit 9 to perform sine wave excitation driving of the stop motor 8 using the sine wave excitation patterns in the ROM which have been described with reference to FIG. 6. The lens microcomputer 3 controls the stop driver circuit 9 to perform sine wave excitation driving of the stop motor 8 in accordance with the information of the aperture control value output from the camera microcomputer 430, thereby driving the aperture stop (not shown) to a target aperture value. When an image pickup operation is performed using the video camera 400, an image is picked up by the image pickup device 410, and sounds are captured by the microphone 420. The image signal and sound signal are then recorded on the recorder part. In this case, since the aperture stop is driven by performing sine wave excitation driving of the stop motor 8, aperture stop operation produces very small sounds. This makes it possible to prevent the sound produced by aperture stop operation from being captured by the microphone 420.

In the above embodiment, information indicating a mounted camera is, for example, an ID code indicating the type of image pickup apparatus. In the above lens-camera communication, the ID code is transmitted from the camera to the lens. The lens then determines on the basis of the ID code whether the mounted camera is a single-lens reflex camera or video camera. If the camera is determined to be a single-lens reflex camera, rectangular wave (1–2 phase)

excitation driving is performed. If the camera is determined to be a video camera, sine wave excitation driving is performed.

In the above embodiment, in the communication between the lens and the camera, the camera may transmit a code designating rectangular wave (1–2 phase) excitation driving or sine wave excitation driving to the lens, and the lens may switch data tables on the basis of the code, thereby switching excitation driving patterns.

As described above, according to the optical apparatus of this embodiment, when the interchangeable lens for a single-lens reflex camera is used for a single-lens reflex camera, high-speed operation can be realized by performing rectangular wave (1–2 phase) excitation driving. In addition, when the interchangeable lens for a single-lens reflex camera according to this embodiment is used for a video camera or digital still camera directly or through an adaptor, more quiet operation can be performed by performing sine wave excitation driving.

The respective function blocks and procedures of the embodiments described above may be implemented by hardware or a microcomputer system constituted by a CPU or MPU, a ROM, a RAM, and the like, which is operated in accordance with an operation program stored in the ROM or RAM. A software program for implementing the function of each function block described above may be supplied to the RAM, and each function block described above is operated in accordance with this program. This implementation is also included in the embodiments described above.

In this case, the program code of the software itself realizes the functions of the above embodiments, and the program code and means for supplying the program code to the computer, e.g., a storage medium which stores the program code, constitutes the present invention. As the storage medium storing the program code, for example, a floppy disk, hard disk, optical disk, magneto-optical disk, CD-ROM, CD-I, CD-R, CD-RW, DVD, zip, magnetic tape, nonvolatile memory card, and the like may be used.

Needless to say, this program code is included in the embodiments of the present invention not only in a case wherein the functions of the above embodiment are realized by executing the supplied program code by the computer but also in a case wherein the functions of the above embodiment are realized in cooperation with an OS (operating system) running on the computer or other applications.

Furthermore, it is included in the present invention that the functions of the above embodiments may be realized by some or all of actual processing operations executed by a CPU or the like arranged in a function extension board or a function extension unit, which is inserted in or connected to the computer, on the basis of instructions from the program code, after the supplied program code is stored in a memory in the function extension board of the computer or the function extension unit connected to the computer.

As has been described above, according to the above embodiments, there is provided an optical apparatus, in which aperture stop driving patterns can be switched in accordance with the image pickup apparatus on which the interchangeable lens is mounted, thereby realizing aperture stop driving suitable for each image pickup apparatus.

What is claimed is:

1. An optical apparatus including an interchangeable lens to be mounted on a plurality of types of image pickup apparatuses in different image taking forms, comprising:

an actuator for driving an optical function member of said interchangeable lens;

a memory storing a plurality of driving patterns for said actuator in advance; and a controller for controlling said actuator to perform driving by using one of the plurality of driving patterns stored in said memory, wherein said controller selects one of the plurality of driving patterns from said memory in accordance with a type of image pickup apparatus on which said interchangeable lens is mounted.

2. An optical apparatus according to claim 1, wherein the optical function member comprises an aperture stop, and said actuator for driving the aperture stop comprises a stepping motor.

3. An optical apparatus according to claim 1, wherein the plurality of types of image pickup apparatuses in the different image taking forms comprise an image pickup apparatus for recording an image and an image pickup apparatus for recording both an image and a sound.

4. An optical apparatus according to claim 3, wherein the image pickup apparatus for recording the image comprises a single-lens reflex camera using a silver halide film and digital still camera, and the image pickup apparatus for recording both the image and the sound comprises a video camera and a digital still camera.

5. An optical apparatus according to claim 1, wherein said actuator comprises a stepping motor, and the plurality of driving patterns stored in said memory to drive the stepping motor comprise a rectangular wave driving pattern and a sine wave driving pattern.

6. An optical apparatus according to claim 5, wherein said controller selects the rectangular wave driving pattern when the image pickup apparatus on which said interchangeable lens is mounted is an image pickup apparatus for recording an image, and said controller selects the sine wave driving pattern when the image pickup apparatus on which said interchangeable lens is mounted is an image pickup apparatus for recording both an image and a sound.

7. An interchangeable lens mountable on a plurality of types of image pickup apparatuses in different image taking forms, comprising:

an actuator for driving an optical function member;

a memory storing a plurality of driving patterns for said actuator in advance; and a controller for controlling said actuator to perform driving using one of the plurality of driving patterns stored in said memory, wherein said controller selects one of the plurality of driving patterns from said memory in accordance with a type of image pickup apparatus on which said interchangeable lens is mounted.

8. An interchangeable lens according to claim 7, wherein the optical function member comprises an aperture stop, and said actuator for driving the aperture stop comprises a stepping motor.

9. An interchangeable lens according to claim 7, wherein the plurality of types of image pickup apparatuses in the different image taking forms comprise an image pickup apparatus for recording an image and an image pickup apparatus for recording both an image and a sound.

10. An interchangeable lens according to claim 9, wherein the image pickup apparatus on which has said interchangeable lens is mountable and which records the image comprises a single-lens reflex camera using a silver halide film and digital still camera, and the image pickup apparatus on which said interchangeable lens is mountable and which records both the image and the sound comprises a video camera and a digital still camera.

11. An interchangeable lens according to claim 7, wherein said actuator comprises a stepping motor, and the plurality of driving patterns stored in said memory to drive the stepping motor comprise a rectangular wave driving pattern and a sine wave driving pattern.

12. An interchangeable lens according to claim 11, wherein said controller selects the rectangular wave driving pattern when the image pickup apparatus on which said interchangeable lens is mounted is an image pickup apparatus for recording an image, and said controller selects the sine wave driving pattern when the image pickup apparatus on which said interchangeable lens is mounted is an image pickup apparatus for recording both an image and a sound.

13. An optical apparatus including an interchangeable lens having a mount with an electric contact for communication, and an image pickup apparatus having a mount which is detachably coupled to the mount of said interchangeable lens and has an electric contact connected to the electric contact of said interchangeable lens to perform communication, comprising:

an actuator for driving an optical function member of said interchangeable lens;

a memory storing a plurality of driving patterns for said actuator in advance; and a controller for obtaining predetermined information from the image pickup apparatus by the communication through the electric contacts and controlling said actuator to perform driving using one of the plurality of driving patterns stored in said memory, wherein said controller selects one of the plurality of driving patterns from said memory in accordance with the predetermined information obtained by the communication.

14. An optical apparatus according to claim 13, wherein the optical function member comprises an aperture stop, and said actuator for driving the aperture stop comprises a stepping motor.

15. An optical apparatus according to claim 13, wherein image pickup apparatus is one of a plurality of types of image pickup apparatuses in different image taking forms that comprise an image pickup apparatus for recording an image and an image pickup apparatus for recording both an image and a sound.

16. An optical apparatus according to claim 15, wherein the image pickup apparatus for recording the image comprises a single-lens reflex camera using a silver halide film and digital still camera, and the image pickup apparatus for recording both the image and the sound comprises a video camera and a digital still camera.

17. An optical apparatus according to claim 13, wherein said actuator comprises a stepping motor, and the plurality of driving patterns stored in said memory to drive the stepping motor comprise a rectangular wave driving pattern and a sine wave driving pattern.

18. An optical apparatus according to claim 13, wherein the predetermined information obtained by said controller by the communication comprises information indicating a type of image pickup apparatus.

19. An optical apparatus according to claim 13, wherein the predetermined information obtained by said controller by the communication comprises information for designating a type of driving pattern.

20. An optical apparatus according to claim 18, wherein said controller selects the rectangular wave driving pattern stored in said memory when the information indicating the type of image pickup apparatus, obtained by the communication, is information indicating an image pickup apparatus for recording an image, and said controller selects the sine wave driving pattern stored in said memory when the information indicating the type of image pickup apparatus, obtained by the communication, is information indicating an image pickup apparatus for recording both an image and a sound.

21. An optical apparatus according to claim 19, wherein said controller selects the rectangular wave driving pattern stored in said memory when the information designating the type of driving pattern, obtained by the communication, is information designating the rectangular wave driving pattern, and said controller selects the sine wave driving pattern stored in said memory when the information designating the type of driving pattern, obtained by the communication, is information designating the sine wave driving pattern.

* * * * *

UNITED STATES PATENT AND TRADEMARK OFFICE
CERTIFICATE OF CORRECTION

PATENT NO.   : 6,546,206 B2                                                          Page 1 of 1
DATED        : April 8, 2003
INVENTOR(S)  : Junichi Murakami It is certified that error appears in the above-identified patent and that said Letters Patent is hereby corrected as shown below:

<u>Title page</u>,
Item [56], References Cited, FOREIGN PATENT DOCUMENTS,
"2873877" should read -- 2-873877 --.

<u>Column 7</u>,
Line 16, "type" should read -- types --;
Line 41, "by" should be deleted; and
Line 49, "by using" should read -- using --.

<u>Column 8</u>,
Line 15, "type" should read -- types --.

<u>Column 10</u>,
Line 66, "has" should be deleted.

<u>Column 11</u>,
Line 47, "image" should read -- the image --.

Signed and Sealed this

Twenty-sixth Day of August, 2003

JAMES E. ROGAN
*Director of the United States Patent and Trademark Office*